United States Patent

Yamanaka

[15] 3,653,754
[45] Apr. 4, 1972

[54] OVERHEAD PROJECTOR
[72] Inventor: Einemi Yamanaka, Kawaguchi-shi, Japan
[73] Assignee: Cabin Kogyo Kabushiki Kaisha, Japan
[22] Filed: Dec. 29, 1969
[21] Appl. No.: 888,313

[52] U.S. Cl. .................................353/61, 353/119, 353/98
[51] Int. Cl. .......................................................G03b 21/16
[58] Field of Search.........................353/57, 61, 119, 98, 122

[56] References Cited

UNITED STATES PATENTS

| | | | |
|---|---|---|---|
| 3,124,035 | 3/1964 | Lucas | 353/119 X |
| 3,167,998 | 2/1965 | Appeldorn et al. | 353/119 X |
| 3,366,005 | 1/1968 | Benedict | 353/119 X |
| 3,209,646 | 10/1965 | Appeldorn et al. | 353/98 |

Primary Examiner—Harry N. Haroian
Attorney—Otto John Munz

[57] ABSTRACT

An overhead projector having an arrangement comprising a body casing containing a light source means, a cooling means and openable stage means mounted by a Fresnel lens, and collapsible supporting means for supporting a projection head, both of said collapsible supporting means and said projection head being adapted to be accommodated within the space in said body casing, and means capable of cutting off the power source circuit as said stage means is opened.

5 Claims, 7 Drawing Figures

INVENTOR
EIMEI YAMANAKA

BY
ATTORNEY

INVENTOR
EIMEI YAMANAKA

BY
ATTORNEY

OVERHEAD PROJECTOR

BACKGROUND OF THE INVENTION

1. Field of the Invention

The present invention is concerned with an overhead projector, and more particularly, it relates to an improved overhead projector designed so as to be conveniently transported.

2. Description of the Prior Art

Overhead projectors are widely used for educational or training purposes in schools and business firms, or as media for aiding lectures for audiences. From the aspect of such purposes of use, it is desirable that overhead projectors be structured conveniently for being transported. Also, they are required to have a prolonged service life.

In general, an overhead projector comprises a body casing containing a light source means, a light source cooling means, and a stage means for supporting a Fresnel lens and a transparent glass panel, a projection head containing a reflecting mirror and a projection lens, and telescopic supporting means for supporting said projection head above said stage means to insure the agreement between the optical axis of said projection head and the optical axis of said Fresnel lens. In such a known overhead projector, said supporting means is secured to the body casing so as to extend upwardly therefrom and to vertically telescope to alter the vertical position of said projection head. Therefore, even when the projection head is brought to its lowest position, the supporting means retains its position of protruding above the upper face of the body casing. Also, the projection head stays on top of the stage means. For these reasons, the overhead projector as a whole will require an unnecessarily large space when it is intended to store the projector when not in use. Also, such an arrangement of the projector of the prior art provides for a great deal of inconvenience in its transportation. Furthermore, in the overhead projector of the prior art, the stage means is secured to the body casing in such a way that it blocks the entire top opening of the body casing. As a result, in case there occurred a damage or a disorder in the light source lamp or the light source cooling means which are housed in said body casing, there was encountered a great inconvenience that the stage means had to be removed from the body casing at each time of their replacement or repair.

SUMMARY OF THE INVENTION

It is, therefore, a primary object of the present invention to provide an overhead projector having an arrangement that the projection head supporting means is collapsibly attached to the body casing and that the stage means is openably attached to the body casing, so that the projector is operative in such a way that said supporting means and the projection head may be accomodated within the space in the body casing to thereby facilitate the transportation or the hand-carry of the projector as a whole.

Another object of the present invention is to provide an overhead projector which permits simplified, easy, quick and safe replacement and repair of the light source means and the light source cooling means.

Still another object of the present invention is to provide an overhead projector which is capable of performing an effective cooling of the light source, the stage means and the like.

Yet another object of the present invention is to provide an overhead projector which permits greatly simplified operations, such as preparation for the projection and housing the projection head and its supporting means into the space in the body casing.

Other objects and advantages of the present invention will become apparent from the following detailed description when taken in conjunction with the accompanying drawings.

DESCRIPTION OF THE PREFERRED EMBODIMENT

Figure 1:
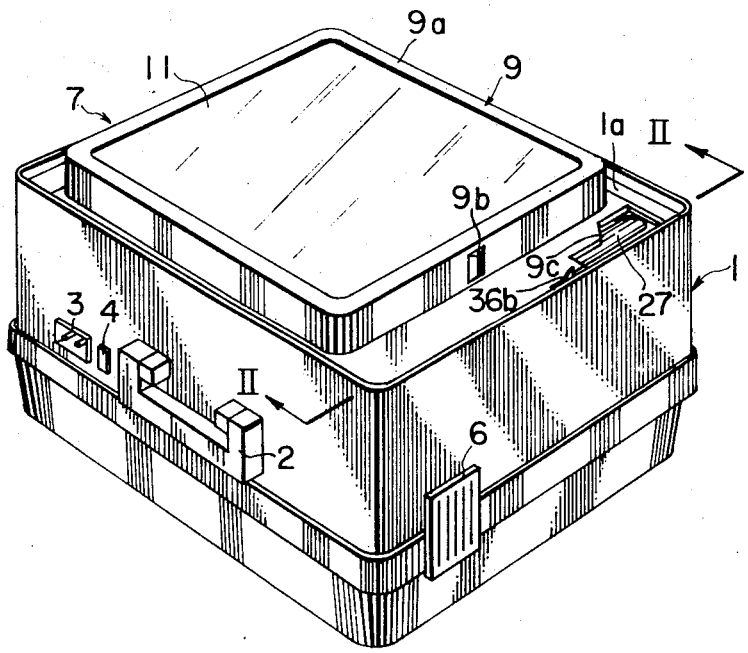
FIG. 1 is a perspective view of an overhead projector embodying the present invention, showing the state in which the top cover is removed and the projection head and its supporting means are accomodated in the body casing.
Figure 2:
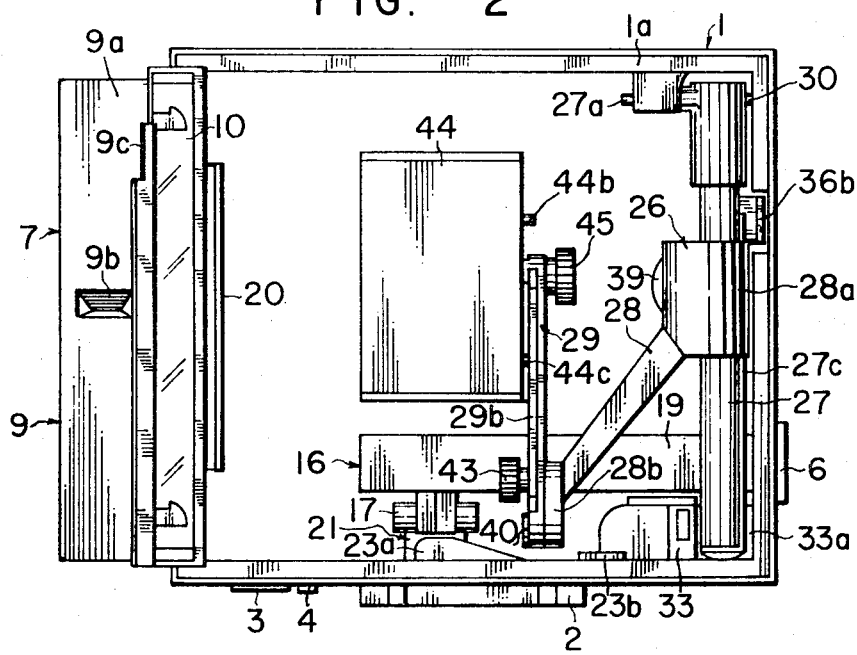
FIG. 2 is a plan view of the overhead projector in FIG. 1, showing the state in which the stage means is opened.
Figure 3:
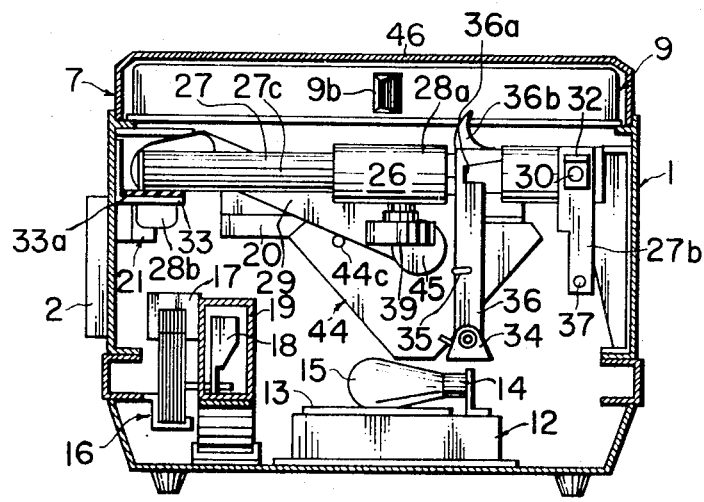
FIG. 3 is a vertical sectional elevation taken along the line III—III in FIG. 1, showing the state of the projector of the present invention with its top cover attached on top thereof.

FIGS. 1 through 3 show the state of the overhead projector of the present invention in which the projection head and its supporting means are housed in the space within the body casing. In these drawings, there is shown a body casing 1 which is formed in the shape of a suit-case having an open top. One one of the side walls of the body casing 1, there is provided a handle 2 for carrying the casing as a whole, a plug 3 for the connection of a power supply cord thereinto, and a switch 4. In another side wall, there is formed a window 5 (see FIG. 5) for introducing fresh external air into the body casing 1. In another side wall, there is provided another window 6 for discharging the air contained in the body casing 1 to the outside thereof. On the top open end of the body casing 1, there is provided a stage means indicated generally at 7 and arranged so as to cover said top open end. This stage means 7 comprises a stage frame 9 which is placed on a flange 1a which is formed on the inner side of the top edge of the body casing 1 and which has one of its sides pivotably secured to said flange 1a by hinges 8 (see FIG. 5) or like means. Inside the bulging hollow portion 9a, there are provided a known Fresnel lens 10 and a transparent panel 11 which are arranged in parallel relation with each other and spaced by leaving a small interval therebetween. Accordingly, the stage means 7 is capable of closing the top open end of the body casing 1 in the manner as shown in FIG. 1, and it is also capable of opening the same as shown in FIG. 2. Reference numeral 9b represents a locking button for retaining the stage means 7 in its closed position.

On the bottom of the body casing 1, there is provided a light source means indicated generally at 12. Said light source means 12 comprises a reflecting mirror 13 which is fixed to the bottom wall of the body casing 1, and a lamp 15 which is fixed in position on the optical axis of said Fresnel lens 10 by being received in a socket 14 which is integral with said reflecting mirror 13. Also, on the bottom of the body casing 1, there is provided a cooling means which is indicated generally at 16. This cooling means 16 comprises a motor 17, a fan 18 which is arranged adjacent to said lamp 15 and is fixed to the rotary shaft of said motor 17, and a duct 19 structured so as to close said fan 18 therein and operative to lead the heated air present in the vicinity of said lamp 15 to the air-discharging window 6. On the inside of the window 5 formed in one of the side wall of the body casing 1, there are provided dust preventive net and an air-deflecting panel 20 (see FIG. 5). As a result, when the cooling means 16 is driven, the external air which has been sucked into the space in the body casing 1 through the window 5 by the rotating fan 18 is directed first to run upwardly by said air-deflecting panel 20 and therefrom to run along the bottom face of the Fresnel lens 10 and then to descend toward the lamp 15. Therefrom, the air is led by the duct 19 to be discharged outside the body casing 1 through the window 6. Accordingly, not only the interior of the body casing 1 but also the Fresnel lens 10 as well as the lamp 15 are quite effectively cooled, thereby accomplishing the prevention of the occurrence of deformation of the Fresnel lens 10 or the deterioration of the function or the service life of the lamp 15 which otherwise could be caused by an excessive heat produced in the body casing 1. Thus, the overhead projector of the present invention can be used and operated continuously for an extended period of time.

Figure 7:
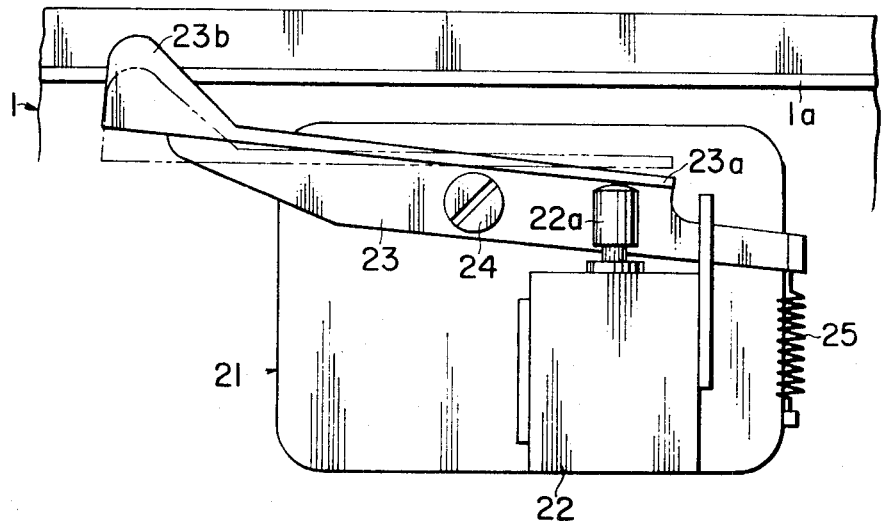
FIG. 7 is a fragmentary sectional view, on an enlarged scale, taken along the line VII—VII in FIG. 4, with the stage means being removed.

As shown in FIG. 7, a switch means indicated generally at 21 is provided on the inner side of one of the side walls of the body casing 1. The switch means 21 comprises a switch 22 and a lever 23 for operating said switch 22. This switch 22 is one of the normally open type which is connected in series between the switch 4 which is connected to said plug 3 and the combination of the lamp 15 and the motor 17 which are connected together in series. Also, the lever 23 is pivotably secured to a shaft 24 and is operative in such a way that it is biased clockwise by a spring 25 in FIG. 7 to thereby depress the button 22a of the switch 22 by means of a flange 23a of said lever 23. The end portion 23b of said lever 23 is arranged so as to protrude outwardly beyond the top edge of the body casing 1 whenever the stage means 7 is opened. Accordingly, when the stage means 7 is in its state of closing the top open end of the body casing 1, the end portion 23b of said lever 23 is pressed upon by the stage frame 9 to be pushed into the interior of the body casing 1. As a result, the lever 23 is forced to make a counter-clockwise rotation against the force of a spring 25 to relieve the switch button 22a of the depression imposed thereto (to the position shown by the dot-and-dash lines in FIG. 7). Accordingly, in this instance, by rendering the switch 4 to the "on" state after the plug is connected to the power source, the lamp 15 will be lighted on and the motor 17 will be started. In contrast to this operation, when the stage means 7 opens the top open end of the body casing 1, the lever 23 is caused to make a clockwise rotation by the force of the spring 25. As a result, the flange 23a of said lever 23 depresses the switch button 22a downwardly (to the position shown in a solid line in FIG. 7), with the result that the switch 22 cuts off the circuit for the lamp 15 and the motor 17. It should be understood that, in this instance, the lamp 15 will not be lighted on nor will the motor 17 be started even when the plug 3 is connected to the power source and even when the switch 4 is turned to the "on" state. As will be clearly understood from the foregoing description, the switch 22 is operated interlockingly with the opening and the closing operation of the stage means 7. It will, therefore, be understood that, when it is intended to perform the replacement of the lamp 15 or the repair of the light source means 12 and/or the cooling means 16, or when it is intended to perform the housing of the supporting means into the body casing 1, or when it is intended to set the device ready for use, these operations may be effected safely without any danger whatsoever even when the plug 3 is connected to the power source.

Figure 4:
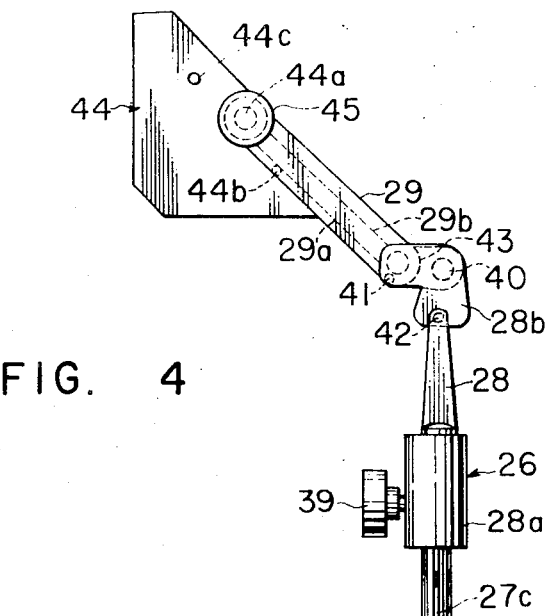
FIG. 4 is a view similar to FIG. 3, showing the state in which the projector is set ready for use.
Figure 4:
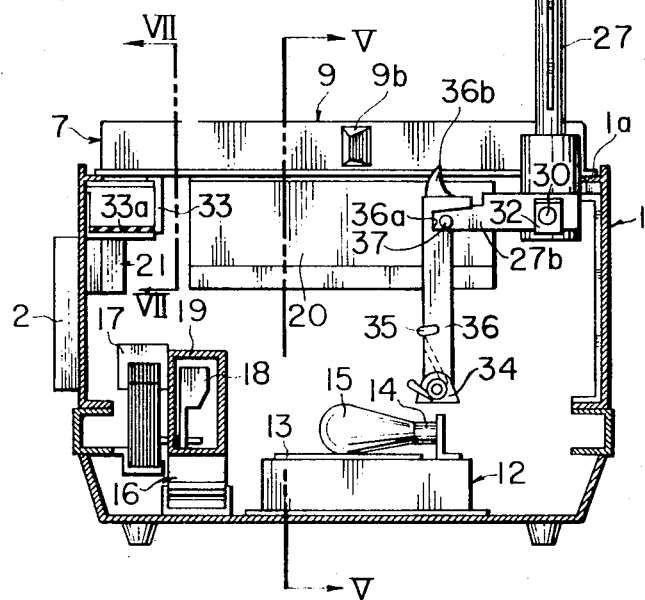
Figures 5, 6:
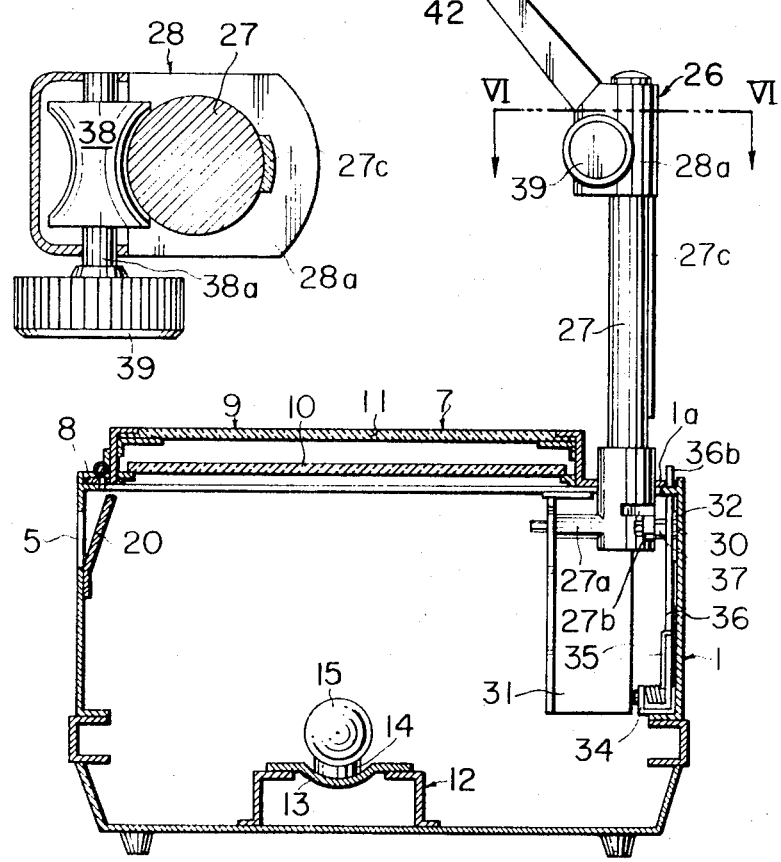
FIG. 5 is a vertical sectional view taken along the line V—V in FIG. 4.
FIG. 6 is a fragmentary sectional view, on an enlarged scale, taken along the line VI—VI in FIG. 5.

In FIGS. 2 through 5, the supporting means for the projection head is indicated generally at 26. This supporting means 26 comprises a strut 27, a first supporting arm 28 and a second supporting arm 29. The strut 27 is columnar in shape as a whole, and has projections 27a and 27b formed at the lower end of the strut 27 in such a way that these projections extend from said lower end so that their extensions will cross at right angle. The foremost end portion of said projection 27a is aligned with a pin 30 which extends outwardly from that side of the strut 27 lying opposite to the side from which said projection 27a extends. This projection 27a and the pin 30 are both rotatably supported by frames 31 and 32 which are secured to the corners of adjacent the side walls of the body casing 1. The length of the strut 27 is selected so as to be able to be accomodated in the space within the body casing 1 in the manner as shown in FIG. 2. Accordingly, the strut 27 may be housed, when it is tilted to its lowermost position, into the space in the body casing 1 in such a way as to be laid substantially in parallel with one of the side walls of the body casing 1 in the manner as shown in FIG. 2. This state of the strut 27 when it is housed in the space within the body casing 1 may be stably retained by supporting the upper end portion of the strut 27 by the use of a frame 33 which, in turn, is secured to one of the side walls of the body casing 1. In order to avoid possible damage which might be caused in the upper end portion of said strut 27 during the operation of housing the strut 27 into the space in the body casing 1 from its erect position, it is preferred to provide a buffer member 33a made of a material such as rubber onto the supporting face of the frame 33. As shown in FIGS. 4 and 5, the strut 27 may be erected upright relative to the body casing 1. This upright position of the strut 27 may be retained by the engagement of a pin 37 extending from the projection 27b of the strut 27 with a hook portion 36a of a lever 36 which, in turn, is pivotably attached to a frame 34 secured to one of the side walls of the body casing 1 and which is biased clockwise by a spring 35 as seen in FIGS. 3 and 4. The end portion 36b of the lever 36 protrudes outwardly from the upper edge of the body casing 1 and is adapted to be exposed therefrom through a notch 9c formed in the stage frame 9 in case the top open end of the body casing 1 is closed by the stage means 7, in such a manner as shown in FIG. 1. Accordingly, by externally pressing on said end portion 36b of the lever 36 clockwise against the force of the spring 35, the hook portion 36a will be relieved of its engagement with the pin 37, and thus, the strut 27 may then be tilted to its lowermost position.

As will be noted in FIG. 6, the first supporting arm 28 is slidably mounted on the strut 27 by a coupling frame 28a which is formed at the bottom thereof. This supporting arm 28 is arranged so as to be able to rotate with respect to the strut 27 by means of a key 27c formed longitudinally of the strut 27. Also, within the coupling frame 28a, there is mounted a roller 38 of a reel type which is formed with a material, such as rubber, which has a large friction coefficient and is arranged so as to be brought into forced contact relation with the circumference of the strut 27. This roller 38 has a shaft 38a to which is secured a knob 39 capable of being manipulated externally of the entire system. Accordingly, by turning this knob 39, it is possible to effect vertical movement of the first supporting arm 28 along the strut 27. As will be noted in FIG. 4, an L-shape member 28b is formed on the foremost end of the first supporting arm 28, said member 28b being arranged to lie perpendicular to the plane containing said first supporting arm 28. The base portion of the second supporting arm 29 is pivotably attached, by a shaft 40, to the L-shape member 28b. accordingly, this second supporting arm 29 will have a relation perpendicular to the plane containing the strut 27 and said first supporting arm 28. As will be noted in FIG. 5, the second supporting arm 29 is of a plate-like configuration having a pair of spaced stepped portions 29a and 29b which face each other and are formed on one side of said plate-like second supporting arm 29 to extend from the base portion to the foremost end portion of said arm 29. As will be noted in FIGS. 4 and 5, the stepped portion 29a is operative in such a way that, when the supporting means 26 is set to the state of being ready for use, said stepped portion 29a will be brought into contact with a pin 41 which extends outwardly from one side of the L-shape member 28b. The stepped portion 29b, on the other hand, is operative in such a way that, when in FIG. 4 the second supporting arm 29 is brought to a position (see FIG. 3) in which it overlaps the strut 27 as it is rotated clockwise about the shaft 40 of said second supporting arm 29, the stepped portion 29b will be brought into contact with a pin 42 which extends outwardly from the L-shape member 28b. Both of these pins 41 and 42 serve as the stoppers for limiting the range of rotation of the second supporting arm 29. Into the base portion of the second supporting arm 29, there is inserted a knob 43 having a threaded shaft being urged outwardly by a coil spring (not shown), said shaft being adapted to be screwed into a threaded hole formed in the L-shape member 28b. This knob 43 is operative in such a way that, when the second supporting arm 29 and the first supporting arm 28 are set to the positions ready for use as shown in FIGS. 4 and 5, and when they are collapsed into its housed state as shown in FIG. 2, both of the second supporting arm 29 and the first supporting arm 28 may be fastened tight to each other in integral fashion by merely turning the knob 43.

The projection head 44 may be rotatably attached to the second supporting arm 29 by inserting a pin 44a extending outwardly from one of the side panels thereof into a hole formed in the foremost end portion of said second supporting arm 29. By means of a nut 45 which is adapted to be in threadable engagement with the pin 44a, the projection head 44 and said second supporting arm 29 may be fastened together integrally. From the same side of the panels of the projection head 44, there extend outwardly two pins 44b and 44c which are located in substantially diametrical portions relative to the threaded pin 44a. When the projection head 44 is in its normal projection position relative to the second supporting arm 29, the pin 44b will engage the stepped portion 29a formed in the second supporting arm 29 as shown in FIGS. 4 and 5 to thereby regulate the position of the projection head 44. On the other hand, in case it is intended to house the projection head 44 and the supporting means 26 into the space within the body casing 1 (see FIG. 2), the nut 45 may be loosened and the projection head 44 may thereby be turned clockwise from its position shown in FIG. 4. As a result, the pin 44c will engage the stepped portion 29b formed in the second supporting arm 29 to thereby regulate the position of the projection head 44 when housed in the space within said body casing 1. The projection head 44 contains a projection lens and a reflecting mirror as is well known in the art. They are operative in such a way that the light rays coming form the lamp 15 which are focused by the Fresnel lens 10 are deflected at right angle to be projected onto the screen.

FIGS. 4 and 5 show the instance in which the projector is set in the state of being ready for use. Description will be made hereunder on the procedure for housing both the supporting means 26 and the projection head 44 into the space in the body casing 1. First, the locking button 9b of the stage frame 9 is manipulated and the stage means 7 is opened from its position in FIG. 1 to the position shown in FIG. 2 to thereby open the top of the body casing 1. Then, the knob 39 is turned and the first supporting arm 28 is lowered to its lowermost position. Thereafter, the nut 45 is loosened and the projection head 44 is rotated clockwise from its position shown in FIG. 4. When the pin 44c is brought into engagement with the stepped portion 29b of the second supporting arm 29, the nut 45 is tightened, to thereby tightly fasten the second supporting arm 29 to the projection head 44 integrally therewith. Thereafter, the knob 43 is turned to disengage it threaded shaft from the threaded hole of the L-shape member 28b. Then, the second supporting arm 29 is turned clockwise about the shaft 40 from the position of the arm 29 shown in FIG. 4. When the stepped portion 29b of the second supporting arm 29 is brought into engagement with the pin 42 extending from the L-shape member 28b, the knob 43 is turned again to screw its threaded shaft into the other threaded hole formed in said L-shape member 28b. Whereupon, the first supporting arm 28 and the second supporting arm 29 are fixed in the collapsed state. Lastly, the end portion 36b of the lever 36 is pulled to the left side from its position shown in FIG. 4. As a result, the hook portion 36a is relieved of its engagement with the pin 37, so that it is now possible to rotate counter-clockwise the strut 27 about the shaft 27a and about the shaft 30, from its position shown in FIG. 4. Therefore, by tilting the strut 27 counter-clockwise, both the supporting means 26 and the projection head 44 are accomodated in compact condition in the space within the body casing 1 in the manner as shown in FIGS. 2 and 3. During this housing operation, the strut 27 may be tilted in rough, quick action. The resulting impact which is imposed upon this strut 27, however, will be mitigated by the buffer member 33a, and accordingly, the foremost end portion of the strut 27 will never sustain any appreciable damage, nor will the supporting means 26 as a whole or any other parts be subjected to adverse effect from the impact. After the supporting means 26 and the projection head 44 have thus been housed within the body casing 1, the stage means 7 may be closed. Whereupon, the stage frame 9 will be automatically locked into the closed state as shown in FIG. 1. In this instance, a cover 46 may be placed on top of the stage means 7 as required, and it is fixed thereto. By doing so, it will become possible to carry the body casing 1 by a person by gripping the handle 2, in a manner similar to carrying a suit-case. When the projector is not in use, it may be placed on a desk or a shelf for storage. Thus, it can be quite conveniently stored and handled.

When it is intended to set the projector ready for use, it is only necessary to resort to a procedure which is just the reverse of that described above. Thus, both the supporting means 26 and the projection head 44 can be set to the state ready for use in a manner as shown in FIG. 4 or FIG. 5 with a simplified procedure. The height at which the projection head 44 is held may be adjusted by merely turning the knob 39. This operation is performed smoothly and easily and non-stepwise, since the reel-like roller 38 is made with a relatively soft and resilient material such as rubber. Thus, the first supporting arm 28 can be positively retained always in its stationary state at a desired height.

As will be understood clearly from the foregoing description, according to the present invention, the operation of setting the supporting means 26 and the projection head 44 to the state ready for use, and the operation of housing them into the space within the body casing 1, can all be rapidly and positively accomplished even in a dark room, without requiring the complicated steps of assembling or separating apart the respective constituting parts of the projector either prior to or after use.

I claim:

1. An overhead projector comprising a body casing containing a light source means and a cooling means, a stage means openably mounted to said body casing and capable of closing the top opening of said body casing, a supporting means for a projection head, said supporting means being tiltably mounted to said body casing and being adapted to be housed in the space within said body casing, a locking means for retaining said supporting means in its erect position, and a projection head supported by said supporting means and capable of being housed in the space within said body casing together with said supporting means and in which said cooling means comprises a fan arranged adjacent to said light source means, a window formed in a side wall of said body casing for introducing external air into said body casing, a deflecting panel attached to a side wall of said body casing in adjacent relation with said window and capable of directing the air introduced from said window to said Fresnel lens, and a duct formed in a side wall of said body casing and capable of sucking the air present in the vicinity of said light source means and also capable of leading the same to an air-discharging window fromed in a side wall of said body casing.

2. An overhead projector according to claim 1, in which said body casing is provided with a switch means capable of being actuated interlockingly with the opening and closing movements of said stage means and capable of opening the circuit for supplying power to said light source means and also to said cooling means as said stage means is opened and also capable of closing said power supply circuit as said stage means is closed.

3. An overhead projector comprising a body casing containing a light source means and a cooling means, a stage means openably mounted to said body casing and capable of closing the top opening of said body casing, a supporting means for a projection head, said supporting means being tiltably mounted to said body casing and being adapted to be housed in the space within said body casing, a locking means for retaining said supporting means in its erect position, and a projection head supported by said supporting means and capable of being housed in the space within said body casing together with said supporting means and in which said supporting means comprises a strut pivotably attached to the body casing, a first supporting arm inserted in said strut for vertical movement via a coupling frame formed in the bottom portion of said first supporting arm, and a second supporting arm having a base portion pivotably and fastenably attached to the foremost end portion of said first supporting arm and also having a projection head fastenably and pivotably attached to the foremost end of said second supporting arm and in which said strut is provided with a key formed circumferentially and longitudinally thereof.

4. An overhead projector according to claim 3, in which said first supporting arm is provided, at the foremost end portion thereof, with a pair of stopper means for limiting the range of movement of said second supporting arm relative to said first supporting arm.

5. An overhead projector according to claim 3, in which said projection head is provided, on the side panel thereof, with a pair of stopper means for limiting the range of movement of said projection head relative to said second supporting arm.

* * * * *